United States Patent [19]

Waryasz

[11] Patent Number: 4,619,315
[45] Date of Patent: Oct. 28, 1986

[54] FLUIDIZED BED BOILER IN-BED TUBE SUPPORT BRACKET

[75] Inventor: Richard E. Waryasz, Longmeadow, Mass.

[73] Assignee: Combustion Engineering, Inc., Windsor, Conn.

[21] Appl. No.: 721,819

[22] Filed: Apr. 10, 1985

[51] Int. Cl.[4] .................. F28C 3/16; F28F 9/00
[52] U.S. Cl. .................. 165/104.16; 34/57 A; 122/4 D; 122/510; 165/162
[58] Field of Search .................. 165/104.16, 162; 122/510, 4 D; 422/146; 34/57 A

[56] References Cited

U.S. PATENT DOCUMENTS

| | | | |
|---|---|---|---|
| 2,847,192 | 8/1958 | Smith et al. | 165/162 |
| 3,459,258 | 8/1969 | Wagner | 165/162 |
| 4,270,599 | 6/1981 | Connell | 165/104.16 |

FOREIGN PATENT DOCUMENTS 937351  1/1956  Fed. Rep. of Germany ...... 122/510

Primary Examiner—Albert W. Davis, Jr.
Attorney, Agent, or Firm—David L. Smith; William W. Habelt

[57] ABSTRACT

A hot support bracket for supporting an in-bed heat exchanger of a fluidized bed furnace is comprised of a plurality of plates having openings or cut-outs along and intersecting at least one edge at each tube support location. Adjacent plates may be interconnected for stability. The hot support bracket is coupled to the top and bottom heat exchanger tube supported thereby with the resulting assembly slidably engaging a wear channel which supports the support bracket and to which the mechanical load of the in-bed heat exchanger is transferred.

4 Claims, 5 Drawing Figures

FLUIDIZED BED BOILER IN-BED TUBE SUPPORT BRACKET

BACKGROUND OF THE INVENTION

The present invention relates to fluidized bed combustion and in particular to apparatus for supporting a tubular heat exchanger immersed in a fluidized bed In present fluidized bed combustion systems, the feed solids are typically discharged through nozzles or openings located in or above the fluidized bed. Combustion air serves as fluidizing air and is supplied to an air plenum located beneath the fluidized bed. The fluidizing air passes upwardly from the air plenum into the fluidized bed through a perforated bed support plate at a flow rate sufficiently high to fluidize the feed solids within the fluidized bed. The feed solids are comprised of sulfur oxide sorbent and sulfur containing carbonaceous fuel. Combustion occurs in the fluidized bed and in the freeboard region above the bed. The combustion flue gases exit the freeboard region through the top of the fluidized bed furnace. A heat exchanger within the fluidized bed as well as the tubular walls containing the fluidized bed transfer thermal energy due to combustion to a working fluid passing through the heat exchanger and tubular panel walls.

In a typical fluidized bed furnace having a pneumatic transport feed system, discharge nozzles are located near the bottom of the fluidized bed above the bed support plate. The feed solids are supplied to the fluidized bed in pneumatic transport air and released into the bed at the discharge nozzles. The bed engulfs the in-bed heat exchanger and the bed bubbling dynamics create an additional load on the heat exchanger that is transmitted to the heat exchanger support bracket. The hostile bed environment thereby reduces the life for uncooled members therein.

Prior art non-working fluid cooled in-bed heat exchanger support racks often failed under these operating conditions necessitating using working fluid cooled supports. It is an object of the present invention to provide a hot (not working fluid cooled) support system for an in-bed heat exchanger that will transmit the load on the heat exchanger to the tube support bracket thence to a support member therebeneath and be readily replaceable without pressure part alteration.

SUMMARY OF THE INVENTION

In accordance with the present invention, a hot support system for supporting a tubular in-bed heat exchanger that transmits the load thereon to the tube support bracket is disclosed. The hot support system is comprised of a plurality of plates disposed perpendicular to the axis of the in-bed heat exchanger tubes. The plates have openings or cut-outs along and intersecting at least one edge at each tube support location. The openings or cut-outs have an inlet that is at least the outside diameter of the tube being supported by the respective opening. The horizontal and vertical spacing of the openings can be varied to accommodate virtually any horizontal spacing as well as any vertical spacing of in-bed heat exchanger tubes. A plate is installed at various points along the length of the tube bank by aligning the plate parallel to the axis of the in-bed heat exchanger tubes between two columns of tubes, inserting the plate between the two columns until the slate engages a support member therebeneath, and the openings in the plate align with the tubes to be supported. The plate is then rotated approximately 90° to be substantially perpendicular to the axis of the in-bed heat exhanger tubes, thereby supporting heat exchanger tubes in at least one column. More than one plate may be interconnected to form a bracket.

DESCRIPTION OF THE PREFERRED EMBODIMENT

Figure 5:
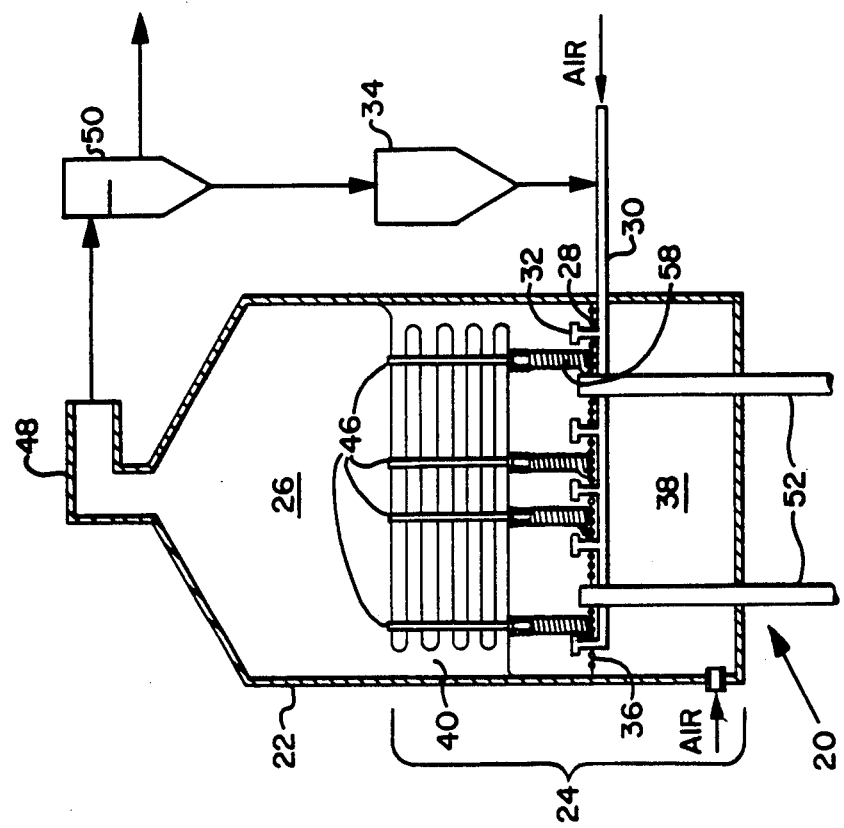
FIG. 5 is a diagrammatic representation of a fluidized bed system incorporating the hot support bracket of the present invention.

Referring to the drawing, there is depicted a fluidized bed system 20, including an in-bed heat exchanger supported by a hot support bracket of the present invention, as best seen in FIG. 5. The walls of fluidized bed furnace 22 are tube banks having a working fluid passing therethrough. Within fluidized bed furnace 22, fluidized bed chamber 24 is located beneath freeboard region 26. The fluidized bed chamber 24 is divided into a combustion region above bed support plate 28 and a fluidizing air inlet region below bed support plate 28. Crushed sulfur containing carbonaceous fuel is supplied to fluidized bed furnace 22 through fuel transport line 30 and discharge nozzles 32. The crushed fuel may be temporarily stored in bin 34 until it is supplied to fluidized bed furnace 22 through a transport feed system either under the bed or over the bed. The fluidizing air is supplied to fluidized bed chamber 24 beneath bed support plate 28 and passes upwardly through air ports 36 in perforated bed support plate 28 into the fluidized bed. Perforated bed support plate 28 functions to support the fluidized bed and provide a partition between the fluidizing air emission zone 38 and fluidized bed 40. The upward velocity of the fluidizing air through air ports 36 is greater than the terminal velocity of the bed solids so as to prevent the bed solids from gravitating into the air emission zone 38 during operation of fluidized bed furnace 22.

Combustion occurs in fluidized bed 40 generating thermal energy that is removed from fluidized bed 40 by working fluid passing through the walls of fluidized bed furnace 22 and working fluid passing through in-bed heat exchanger 42. In-bed heat exchanger 42, supported by hot support bracket 46, is primarily used for generating steam. During combustion, the fluidized bed engulfs in-bed heat exchanger 42 generating varying mechanical loads in addition to the weight of the heat exchanger and working fluid passing therethrough that must be carried by hot support bracket 46. As the fuel is consumed in fluidized bed 40, the particle size decreases and the smaller particles become light enough to be carried out of fluidized bed 40 into freeboard region 26. Some of the entrained fuel particles will fall back into fluidized bed 40 while others become completely consumed within freeboard region 26. The remaining small portion of particles entrained in the combustion flue gas, along with other particulate matter such as flyash are carried out of fluidized bed furnace 22 through gas outlet 48.

The flue gas passing through gas outlet 48 is passed through a particulate filter. The particulate filter separates entrained particulate matter from the flue gas so that the particulate matter may be recycled back into fluidized bed furnace 22. Typically, a particulate filter, 50 such as a cyclone separator, is disposed in the flue gas stream leaving fluidized bed furnace 22 to remove the particulate matter entrained therein and recycle the particulate matter back to fluidized bed 40.

A bed drain system is provided to maintain bed height at a preselected level and to continuously or periodically purge the fluidized bed 40 of any unnecessary material such as ash particles and spent sulfur oxide sorbent. A plurality of bed drain pipes 52 pass through or around air emission zone 38 and extend upwardly into fluidized bed 40 thereby providing a flow passage communicating between fluidized bed 40 and the outside of fluidized bed furnace 22 through which the bed drain material can be removed.

Figure 2:
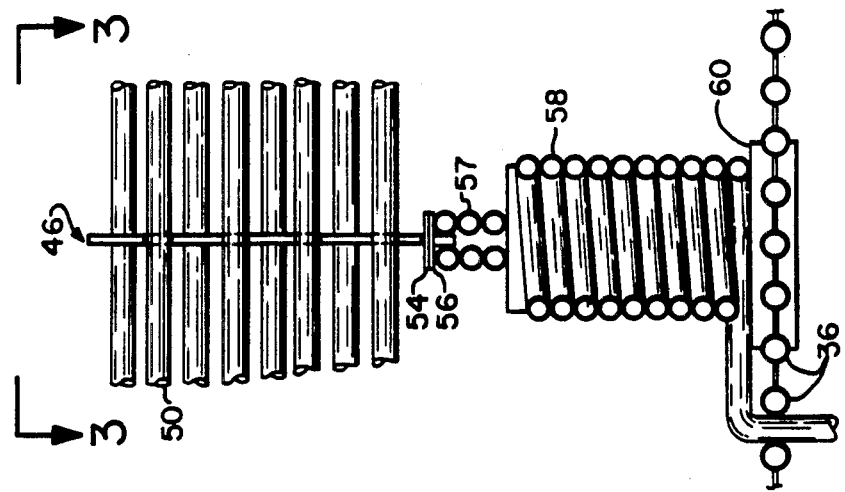
FIG. 2 is a side view of the hot support bracket.
Figure 1:
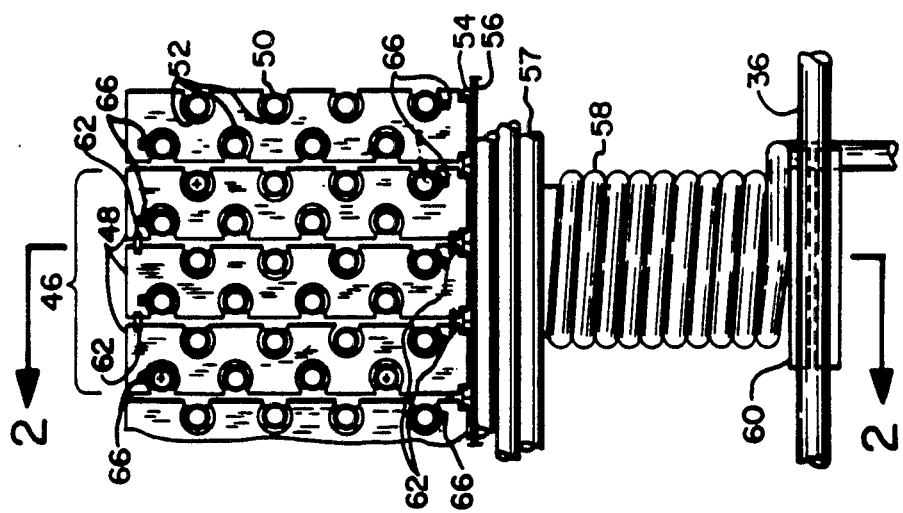
FIG. 1 is a front view of the hot support bracket of the present invention.

The varying load on the in-bed heat exchanger support bracket is transmitted to the base of support bracket 46. A front view of the hot support bracket of the present invention is shown as FIG. 1. Hot support bracket 46 is comprised of one or more plates 48 disposed perpendicular to the axis of the in-bed heat exchanger tubes 50. Plates 48 have openings or cut-outs 52 along and intersecting at least one edge at each heat exchanger tube 50 support location. The vertical spacing of openings or cut-outs 52 can be varied to accommodate virtually any vertical spacing of in-bed heat exchanger tubes 50. Support bracket 46 is installed by aligning a plate 48 parallel to the axis of in-bed heat exchanger tubes 50 between two columns thereof, inserting plate 48 between the two columns of heat exchanger tubes 50 until openings or cut-outs 52 align with heat exchanger tubes 50 and plate 48 engages a wear channel 54 beneath in-bed heat exchanger 42. In this manner, the thickness of plate 48 is constrained to be less than the distance between the vertical projection of adjacent columns of in-bed heat exchanger tubes 50.

Plate 48 is then rotated approximately 90° to be substantially perpendicular to the axis of in-bed heat exchanger tubes 50 thereby engaging each opening or cut-out 52 with a corresponding heat exchanger tube 50 to provide support therefor. Each in-bed heat exchanger tube 50 engages a plate 48 thereby transmitting the mechanical load of in-bed heat exchanger 42 through plate 48 to a wear channel 54 therebeneath. Wear channels 54 are of sufficient length to accommodate thermal expansion and contraction of heat exchanger tubes 50. Wear channels 54 are typically secured to and supported by support plate 56 which in turn is typically supported by a beam 57 and pilar 58 that may or may not be fluid cooled. Pilar footing 60 engages air distributor 36 and supports pilar 58.

Support bracket 46 is clipped to the top and bottom heat exchanger tube 50 in the tube assembly such as by welded member 66 thereby becoming a part of the tube assembly that grows thermally sliding along wear channels 54 on thermal expansion or contraction of tubes 50. The mechanical load of the in-bed heat exchanger 42 is thereby transmitted through plates 48 and wear channels 54 to support plate 56 and pilars 58.

In a preferred embodiment, plates 48 are substantially rectangular having openings or cut-outs 52 along the relatively longer edges with each opening or cut-out 52 intersecting only one of the two relatively longer edges of plate 48. The length of the intersection 68 of openings or cut-outs 52 with the edge of plate 48 is at least the outside diameter of the tubes of in-bed heat exchanger 42. The width of openings or cut-outs 52 from the intersection of openings or cut-outs 52 with the closer relatively longer edge of plate 48 is sufficient to accommodate a heat exchanger tube 50 of in-bed heat exchanger 42. Openings or cut-outs 52 may be substantially circular in shape with the intersection 68 of the substantially circular opening or cut-out 52 with the edge of plate 48 being a chord of the substantially circular opening or cut-out 52. The length of the chord intersection 68 must be sufficient to accommodate a tube of in-bed heat exchanger 42 being supported. If the center line 70 of heat exchanger tube 50 is aligned with the edge of plate 48 or is within plate 48, the length of the chord must be at least the outside diameter of a heat exchanger tube 50.

Although a single plate 48 may form a hot support bracket 46, two or more plates 48 may interconnect to form a support bracket 46 with greater stability than a single plate 48 would provide. In a preferred embodiment, three plates 48 are interconnected to form a support bracket 46. Plates 48 are interconnected such as by welded interlock 62 between adjacent plates 48. Support bracket 46 formed by interconnecting adjacent plates 48 is substantially planar.

Figure 4:
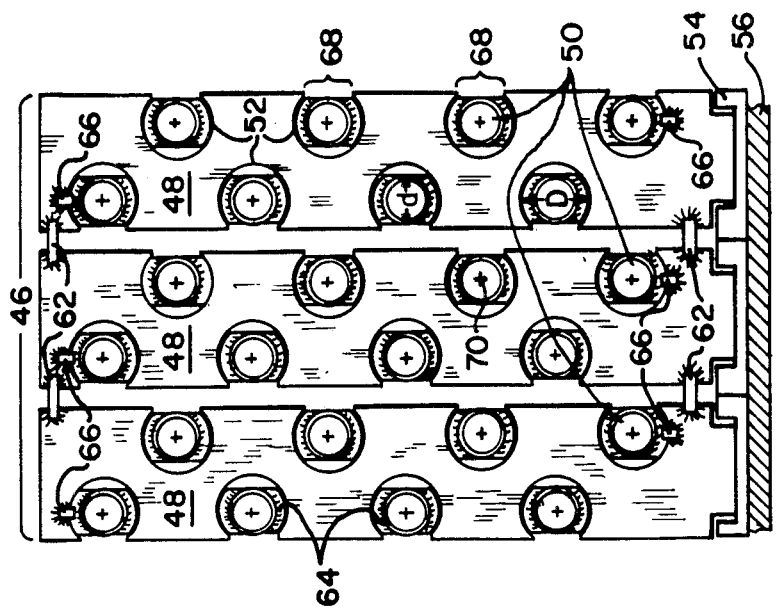
FIG. 4 is a front view of a portion of the hot support bracket on a larger scale showing the wear surfaces and intrabracket connections in more detail.
Figure 3:
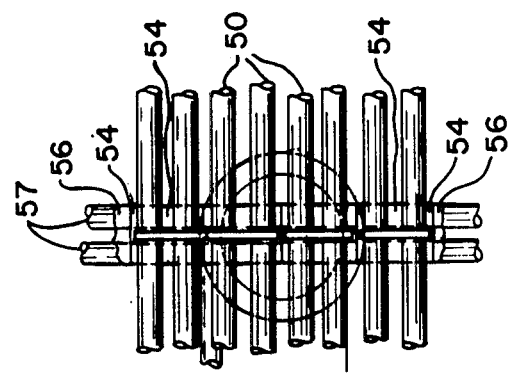
FIG. 3 is a plan view of the hot support bracket.

As best seen in FIG. 4, concave bosses 64 may be provided on the upper and lower surfaces of in-bed heat exchanger tubes 50 in the region of tube support. Concave bosses 64 may be welded to in-bed heat exchanger tubes 50 thereby providing an effectively increased outside diameter on the upper and lower surfaces of in-bed heat exchanger tubes 50. Concave bosses 64 provide an effectively greater outside diameter of in-bed heat exchanger tubes 60 to be accommodated by openings or cut-outs 52 in plate 48 of hot support bracket 46. The intersecting edge of plate 48 with a substantially circular opening or cut-out 52 need only result in a chord of the substantially circular opening or cut-out 52 that is the length of the outside diameter, d, of in-bed heat exchanger tube 50 where plate 48 may be inserted between two adjacent columns of in-bed heat exchanger tubes 50 axially removed from concave bosses 64, rotated approximately 90° to be substantially perpendicular to the axis of the in-bed heat exchanger tubes 50 and then moved axially along in-bed heat exchanger tubes 50 until openings or cut-outs 52 encompass the effectively increased outside diameter of concave bosses 64 on in-bed heat exchanger tubes 50.

Plate 48 may then be welded to concave bosses 64 on the upper and lower tubes supported thereby such as by welded interlock 66. Plate 48 is clipped to the tube assembly on the upper and lower rows with interlocks 66 typically welded in such a location on both sides of plate 48 that they trap the concave bosses between them.

Concave bosses 64 provide a wear surface on which the tubes may rest as they are supported by support bracket 46 and also provide a means by which in-bed heat exchanger tubes 50 are laterally retained within openings or cut-outs 52 of support bracket 46 since the effective diameter, D, of in-bed heat exchanger tubes 50 including concave bosses 64 is greater than the intersecting chord of openings or cut-outs 52 and plate 48.

The support bracket 46 of the present invention has the desirable attribute that it may be replaced without pressure part alteration even though typical in-bed tube assemblies are tightly spaced and even though access to the middle of a tube bundle is virtually impossible. Removal of support bracket 46 is accomplished by reversing the installation procedure specifically, welded interlocks 62 are removed thence welded interlocks 66 attaching plate 48 to concave bosses 64 of the upper and lower tubes supported by a particular plate 48 are removed thence plate 48 is slid axially along heat exchanger tubes 50 away from concave bosses 64 thence rotated approximately 90° to be substantially parallel to the axis of the in-bed heat exchanger tubes 50 and removed from between two columns of heat exchanger tubes 50.

The lower end of plate 48 engages wear channel 54. Wear channel 54 may have a U-shaped cross section as shown in FIG. 4 to limit or prevent lateral movement of heat exchanger tubes 50. If plate 48 extends laterally beyond the flat lower portion of wear channel 54 into or beyond the vertical extensions, it may be necessary to notch plate 48 to accommodate the vertical extensions of wear channels 54.

Although the present invention has been described with respect to a preferred embodiment, it is not limited thereto. Those skilled in the art may make modifications to the preferred embodiment within the scope of the invention as claimed in the appended claims. Modifications may include but are not limited to varying the shape of openings or cut-outs 52 from being substantially circular, support bracket 46 accommodating tubes of various outside diameters in in-bed heat exchanger 42.

What is claimed is:

1. In a fluidized bed system having a tubular heat exchange bundle immersed within a bed region of the fluidized bed which includes a plurality of axially parallel vertically and horiztonally spaced tubes having an outside diameter arrayed in horiztonal rows and vertical columns through which a working fluid is passed in heat exchange relationship with the bed region, an inner bank tube support structure for supporting the tubes of the tubular heat exchange bundle comprising:

a. a pluralithy of vertically spaced plates extending transversely between adjacent vertical columns of heat exchange tubes, each plate transmitting the mechanical load of a predetermained portion of the immersed heat exchange tubes to a support member therebeneath, each plate having an edge and a plurality of substantially circular openings along and intersecting the edge of each plate, each opening having a diameter greater than the outside diameter of a heat exchange tube whereby each opening is adapted to encompass a heat exchange tube in spaced relationship therewith, the length of the intersection of the substantially circular opening with the edge of each plate being a chord of the substantially circular opening that is substantially the outside diameter of a heat exchange tube, the vertical and horiztonal spacing of the openings being such as to correspond to the vertical and horizontal spacing of the in-bed heat exchange tubes being supported; and b. a plurality of wear inserts, at least one wear insert per tube, disposed to surround at least a portion of each heat exchange tube in the region of support intermediate the outside diameter of the heat exchange tube and the opening in the plate encompassing the heat exchange tube so as to span the space therebetween.

2. A support structure as recited in claim 1 further comprising means for interconnecting laterally adjacent plates of the plurality of plates to form a substantially planar support bracket.

3. A support structure as recited in claim 1 further comprising means for interconnecting each plate to a tube supported thereby.

4. A support structure as recited in claim 3 wherein each plate is interconnected to a tube supported thereby by a tab welded to and interconnecting the plate to a wear insert, the wear insert being welded to the tube it surrounds.

* * * * *